United States Patent
Harinath et al.

(10) Patent No.: US 10,247,070 B2
(45) Date of Patent: Apr. 2, 2019

(54) SYSTEM AND METHODS FOR REDUCING SOX GASES IN AFTERTREATMENT SYSTEMS

(71) Applicant: Cummins Emission Solutions Inc., Columbus, IN (US)

(72) Inventors: Arvind V. Harinath, Columbus, IN (US); Matthew P. Henrichsen, Columbus, IN (US)

(73) Assignee: Cummins Emission Solutions Inc., Columbus, IN (US)

( * ) Notice: Subject to any disclaimer, the term of this patent is extended or adjusted under 35 U.S.C. 154(b) by 62 days.

(21) Appl. No.: 15/432,394

(22) Filed: Feb. 14, 2017

(65) Prior Publication Data

US 2017/0234183 A1    Aug. 17, 2017

Related U.S. Application Data

(60) Provisional application No. 62/295,718, filed on Feb. 16, 2016.

(51) Int. Cl.
| | |
|---|---|
| *F01N 3/08* | (2006.01) |
| *F01N 3/20* | (2006.01) |
| *F01N 3/035* | (2006.01) |
| *F01N 13/00* | (2010.01) |

(52) U.S. Cl.
CPC ......... *F01N 3/0814* (2013.01); *F01N 3/035* (2013.01); *F01N 3/085* (2013.01); *F01N 3/2066* (2013.01); *F01N 13/009* (2014.06); *F01N 13/0093* (2014.06); *F01N 2560/026* (2013.01); *F01N 2560/027* (2013.01); *F01N 2570/04* (2013.01); *F01N 2610/02* (2013.01); *Y02T 10/24* (2013.01)

(58) Field of Classification Search
CPC .............................. F01N 3/0814; F01N 3/085
See application file for complete search history.

(56) References Cited

U.S. PATENT DOCUMENTS

| | | | |
|---|---|---|---|
| 7,082,753 B2 | 8/2006 | Dalla Betta et al. | |
| 7,225,613 B2 * | 6/2007 | Hammerle | ............ F01N 3/0222 422/177 |
| 7,334,400 B2 | 2/2008 | Yan et al. | |
| 8,062,601 B2 * | 11/2011 | Cheng | ..................... F01N 3/023 422/177 |
| 8,443,592 B2 | 5/2013 | Asanuma et al. | |

(Continued)

FOREIGN PATENT DOCUMENTS

| | | | | |
|---|---|---|---|---|
| JP | 2004084502 A | * | 3/2004 | |
| JP | 2004150382 A | * | 5/2004 | |

OTHER PUBLICATIONS

International Search Report and Written Opinion for PCT/US2014/051884, dated Dec. 18, 2014, 10 Pages.

*Primary Examiner* — Patrick D Maines
(74) *Attorney, Agent, or Firm* — Foley & Lardner LLP (57) ABSTRACT

An aftertreatment system comprises a SCR system including a catalyst formulated to decompose constituents of an exhaust gas passing therethrough. A filter is positioned upstream of the SCR system. The filter comprises a sulfur suppressing compound formulated to reduce an amount of SOx gases included in the exhaust gas flowing through the aftertreatment system. In particular embodiments, the filter comprises a filter housing and a filter element positioned within the filter housing. The filter element comprises the sulfur suppressing compound.

18 Claims, 4 Drawing Sheets

(56) References Cited

U.S. PATENT DOCUMENTS

| | | |
|---|---|---|
| 8,540,952 B2 | 9/2013 | Swallow et al. |
| 8,887,495 B2 * | 11/2014 | Ren .................. B01D 46/0024 |
| | | 60/274 |
| 2006/0185352 A1 | 8/2006 | Twigg |
| 2009/0077948 A1 * | 3/2009 | Mondori ............... F01N 3/0842 |
| | | 60/285 |
| 2009/0255233 A1 * | 10/2009 | Yoshida ............. B01D 53/9431 |
| | | 60/286 |
| 2013/0149222 A1 | 6/2013 | Blakeman et al. |
| 2015/0143802 A1 * | 5/2015 | Huhn .................... F01N 9/002 |
| | | 60/311 |

* cited by examiner

SYSTEM AND METHODS FOR REDUCING SOX GASES IN AFTERTREATMENT SYSTEMS

CROSS-REFERENCE TO RELATED APPLICATIONS

The present application claims priority to U.S. Provisional Patent Application No. 62/295,718, filed Feb. 16, 2016 and the contents of which are incorporated herein by reference in the entirety and for all purposes.

TECHNICAL FIELD

The present disclosure relates generally to aftertreatment systems for use with internal combustion (IC) engines.

BACKGROUND

During the combustion process in an IC engine (e.g., a diesel IC engine), sulfur may be concurrently formed with carbon monoxide (CO) and hydrocarbons (HC) as various sulfur oxides (SOx). Typically, 97-99% of the total amount of SOx present in exhaust gas comprises sulfur dioxide ($SO_2$), and 1-3% comprises sulfur trioxide ($SO_3$). Thus, fuel with higher sulfur content tends to produce higher amounts of $SO_3$. For example, fuel with sulfur content of 1,000 ppm may form approximately 1-3 ppm $SO_3$.

Exhaust aftertreatment systems are used to receive and treat exhaust gas generated by IC engines. Conventional exhaust gas aftertreatment systems include any of several different components to reduce the levels of harmful exhaust emissions present in exhaust gas. For example, certain exhaust aftertreatment systems for diesel-powered IC engines include a selective catalytic reduction (SCR) catalyst to convert NOx (NO and $NO_2$ in some fraction) into harmless nitrogen gas ($N_2$) and water vapor ($H_2O$) in the presence of ammonia ($NH_3$).

Oxidation of $SO_2$ present in the exhaust gas can lead to an increase in $SO_3$ content of the exhaust gas, e.g. due to oxidation of $SO_2$ to $SO_3$. The $SO_3$ can react with ammonia provided by the reductant to produce ammonium sulfate (($NH_4)_2SO_4$) and ammonium bisulfate ($NH_4HSO_4$), which can reduce the amount of ammonia available for facilitating decomposition of NOx gases within the SCR system. Furthermore, the higher $SO_3$ content can also reduce a filtering efficiency of one or more particulate sensors included in the aftertreatment system and/or poison one or more oxidation catalysts included in the aftertreatment system.

SUMMARY

Embodiments described herein relate generally to systems and methods for reducing the amount of SOx gases included in an exhaust gas flowing through an aftertreatment system and in particular, to systems and methods for providing a sulfur suppressing compound in a filter positioned upstream and/or downstream of an SCR system of the aftertreatment system so as to reduce SOX gases included in the exhaust gas.

In some embodiments, an aftertreatment system comprises a SCR system including a catalyst formulated to decompose constituents of an exhaust gas passing therethrough. A filter is positioned upstream of the SCR system. The filter comprises a sulfur suppressing compound formulated to reduce an amount of SOx gases included in the exhaust gas flowing through the aftertreatment system. In particular embodiments, the filter comprises a filter housing and a filter element positioned within the filter housing. The filter element comprises the sulfur suppressing compound.

Other embodiments described herein relate to a method of treating exhaust gas in an aftertreatment system. Exhaust gas is passed through a filter comprising a sulfur suppressing compound, the sulfur suppressing compound reducing an amount of SOx gases included in the exhaust gas flowing through the aftertreatment system. After passing the exhaust gas through the filter, the exhaust gas passes through a selective catalytic reduction system comprising a catalyst, the catalyst decomposing constituents of the exhaust gas passing therethrough.

It should be appreciated that all combinations of the foregoing concepts and additional concepts discussed in greater detail below (provided such concepts are not mutually inconsistent) are contemplated as being part of the subject matter disclosed herein. In particular, all combinations of claimed subject matter appearing at the end of this disclosure are contemplated as being part of the subject matter disclosed herein.

BRIEF DESCRIPTION OF DRAWINGS

The foregoing and other features of the present disclosure will become more fully apparent from the following description and appended claims, taken in conjunction with the accompanying drawings. Understanding that these drawings depict only several implementations in accordance with the disclosure and are therefore, not to be considered limiting of its scope, the disclosure will be described with additional specificity and detail through use of the accompanying drawings.

Reference is made to the accompanying drawings throughout the following detailed description. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

DETAILED DESCRIPTION OF VARIOUS EMBODIMENTS

Embodiments described herein relate generally to systems and methods for reducing the amount of SOx gases included in an exhaust gas flowing through an aftertreatment system and in particular, to systems and methods for providing a sulfur suppressing compound in a filter positioned upstream and/or downstream of an SCR system of the aftertreatment system so as to reduce SOx gases included in the exhaust gas.

Oxidation of $SO_2$ present in an exhaust gas flowing through an aftertreatment system can lead to an increase in $SO_3$ content of the exhaust gas, for example due to oxidation of $SO_2$ to $SO_3$ as the exhaust gas flows through the aftertreatment system. The $SO_3$ can react with ammonia provided by the reductant to produce ammonium sulfate (($NH_4)_2SO_4$) and ammonium bisulfate ($NH_4HSO_4$), which can reduce the amount of ammonia available for facilitating decomposition of NOx gases within the SCR system. Furthermore, the higher $SO_3$ content can also reduce a filtering efficiency of one or more particulate sensors included in the aftertreatment system, and/or poison one or more oxidation catalyst included in the aftertreatment system. The amount of $SO_3$ can be even higher in exhaust gases produced by engines running on fuels having a high sulfur content.

Various embodiments of the systems and methods described herein for reducing an amount of SOx gases included in an exhaust gas flowing through an aftertreatment system may provide benefits including, for example: (1) suppressing the oxidation of $SO_2$ to $SO_3$ by integrating a sulfur suppressing compound within a filter of the aftertreatment system; (2) allowing integration of the sulfur suppressing compound in wall flow filters as well as partial flow filters; (3) limiting any negative impacts on a passive regeneration rate of an oxidation catalyst (e.g., a diesel oxidation catalyst) included in the aftertreatment system by providing the sulfur suppressing compound within an existing filter without significant modifications of the oxidation catalyst; and (4) allowing integration of the sulfur suppressing compound in existing aftertreatment components, thereby circumventing reengineering of the aftertreatment system to accommodate separate sulfur reducing components in the aftertreatment system.

Figure 1:
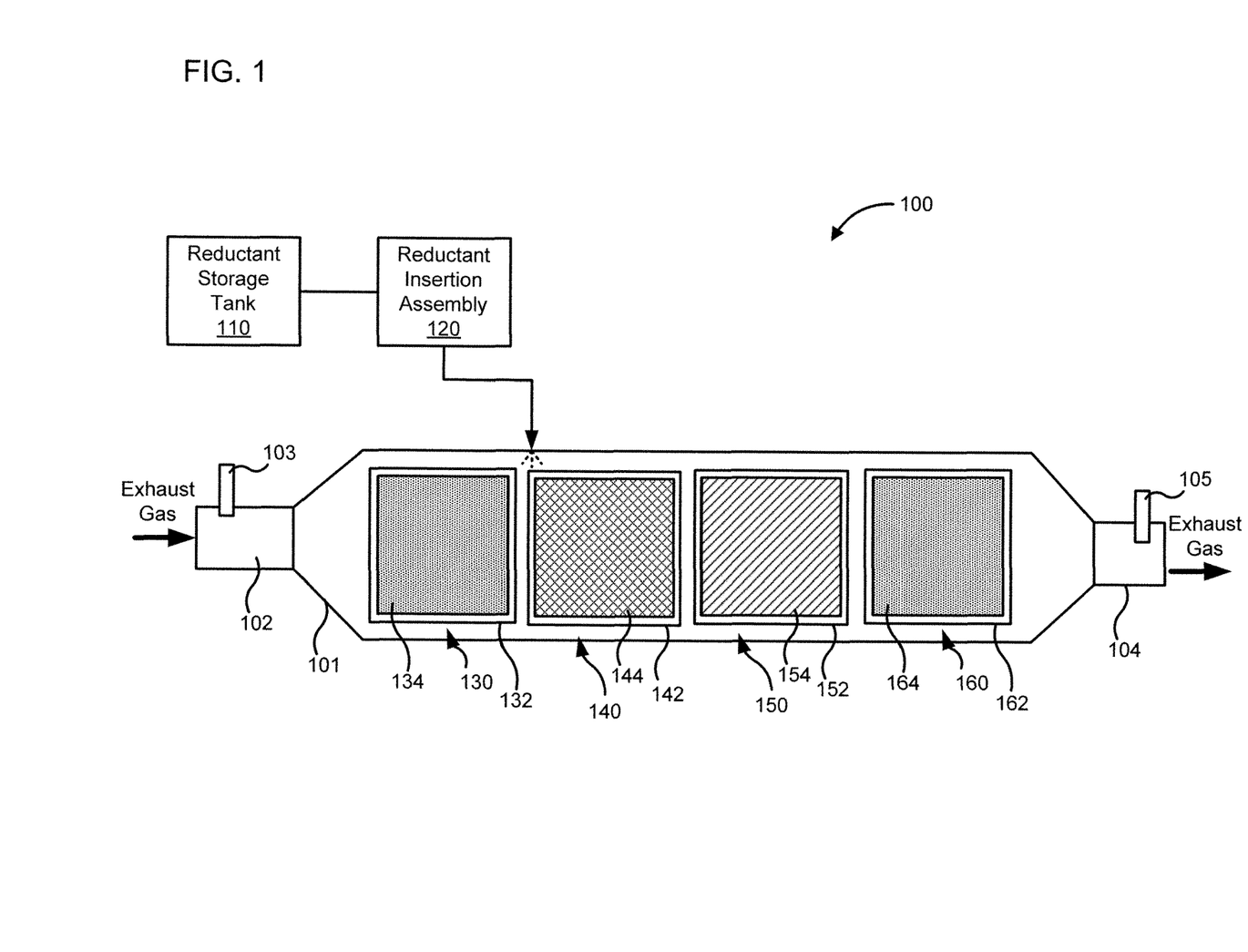
FIG. 1 is a schematic illustration of an aftertreatment system according to an embodiment.

FIG. 1 is a schematic illustration of an aftertreatment system 100, according to an embodiment. The aftertreatment system 100 may be fluidly coupled to an engine and configured to decompose constituents (e.g., NOx gases) included in an exhaust gas produced by the engine. The engine can include an IC engine operable on diesel, gasoline, natural gas, biodiesel, ethanol, liquefied petroleum gas (LPG) or any other fuel source. The fuel may include sulfur so that the exhaust gas generated by the engine includes SOx gases, for example $SO_2$ and/or $SO_3$. The aftertreatment system 100 includes a SCR system 150, a reductant storage tank 110, a reductant insertion assembly 120, a first filter 130, and optionally a second filter 160 and/or an oxidation assembly 140.

The aftertreatment system 100 may include a housing 101 defining an internal volume within which various components of the aftertreatment system 100 are positioned. The housing 101 may be formed from a rigid, heat resistance and/or corrosion resistant material, for example stainless steel, iron, aluminum, metals, ceramics or any other suitable material. The housing 101 can have any suitable cross-section, for example circular, square, rectangular, oval, elliptical, polygonal or any other suitable shape.

An inlet conduit 102 is fluidly coupled to a housing inlet of the housing 101. The inlet conduit 102 is structured to receive the exhaust gas (e.g., a diesel exhaust gas) from the engine (e.g., a diesel engine) and communicate the exhaust gas to the internal volume of the housing 101. An outlet conduit 104 is fluidly coupled to a housing outlet of the housing 101 and is structured to expel treated exhaust gas into the environment.

An inlet sensor 103 is positioned upstream of the SCR system 150 proximate to an inlet of the inlet conduit 102. The inlet sensor 103 may include a NOx sensor (e.g., a physical or virtual NOx sensor) or a SOx sensor (e.g., a physical or virtual SOx sensor) configured to determine an inlet NOx amount of NOx gases or an inlet SOx amount of SOx gases, respectively, included in the exhaust gas entering the aftertreatment system 100.

An outlet sensor 105 may be positioned downstream of the SCR system 150, for example in the outlet conduit 104. The outlet sensor 105 may include a NOx sensor (e.g., a physical or virtual NOx sensor) or a SOx sensor (e.g., a physical or virtual SOx sensor) configured to determine an outlet NOx amount of NOx gases or an outlet SOx amount of SOx gases, respectively, included the exhaust gas being expelled from the aftertreatment system 100.

In various embodiments, other sensor may be positioned at any location on the aftertreatment system 100, for example pressure sensors (e.g., differential pressure sensor positioned across the first filter 130, the second filter 160 and/or the SCR system 150), temperature sensors (e.g., positioned in the inlet conduit 102, the outlet conduit 104, upstream and/or downstream of the SCR system 150), oxygen sensors or any other suitable sensors.

The SCR system 150 is positioned within the internal volume defined by the housing 101. The SCR system 150 may include a SCR system housing 152 defining an internal volume within which a catalyst 154 is positioned. The SCR system housing 152 may be formed from a rigid, heat resistant and corrosion resistant material, for example stainless steel, iron, aluminum, metals, ceramics or any other suitable material. The SCR system housing 152 may have any suitable cross-section, for example similar to the cross-section defined by the housing 101.

The catalyst 154 is formulated to selectively decompose constituents of the exhaust gas. Any suitable catalyst can be used such as, for example, platinum, palladium, rhodium, cerium, iron, manganese, copper, vanadium based catalysts, other suitable catalyst, and/or combinations thereof. The catalyst 154 can be disposed on a suitable substrate such as, for example, a ceramic (e.g., cordierite) or metallic (e.g., kanthal) monolith core which can, for example, define a honeycomb structure.

A washcoat can also be used as a carrier material for the catalysts. Such washcoat materials can include, for example, aluminum oxide, titanium dioxide, silicon dioxide, any other suitable washcoat material, or combinations thereof. The exhaust gas (e.g., diesel exhaust gas) can flow over and about the catalyst 154 such that any NOx gases included in the exhaust gas are further reduced to yield an exhaust gas which is substantially free of carbon monoxide, and NOx gases.

The reductant storage tank 110 (also referred to herein as the "tank 110") is structured to store a reductant. The reductant is formulated to facilitate decomposition of the constituents of the exhaust gas (e.g., NOx gases included in the exhaust gas). Any suitable reductant can be used. In some embodiments, the exhaust gas can include a diesel exhaust gas and the reductant can include a diesel exhaust fluid. For example, the diesel exhaust fluid can include urea, an aqueous solution of urea, or any other fluid that includes ammonia, by products, or any other diesel exhaust fluid as is known in the arts (e.g., the diesel exhaust fluid marketed under the name ADBLUE®). For example, the reductant may include an aqueous urea solution having a particular ratio of urea to water. In particular embodiments, the reductant can include an aqueous urea solution including 32.5% by volume urea and 67.5% deionized water.

A reductant insertion assembly 120 is fluidly coupled to the tank 110. The reductant insertion assembly 120 is configured to selectively inject or otherwise insert the reductant into the SCR system 150 or upstream thereof or a mixer (not shown) positioned upstream of the SCR system 150. The reductant insertion assembly 120 may include various structures to facilitate receipt of the reductant from the tank 110 and delivery to the SCR system 150.

For example, the reductant insertion assembly 120 may include one or more pumps having filter screens (e.g., to prevent solid particles of the reductant or contaminants from flowing into the pump), and/or valves (e.g., check valves) positioned upstream thereof to receive reductant from the tank 110. In some embodiments, the pump may include a diaphragm pump but any other suitable pump may be used such as, for example a centrifugal pump, a suction pump, etc. The pump is configured to pressurize the reductant so as to provide the reductant to the SCR system 150 at a predetermined pressure. Screens, check valves, pulsation dampers or other structures may also be positioned downstream of the pump to provide the reductant to the SCR system 150. In various embodiments, the reductant insertion assembly 120 may also include a bypass line structured to provide a return path of the reductant from the pump to the tank 110.

A valve (e.g., an orifice valve) may be provided in the bypass line. The valve may be structured to allow the reductant to pass therethrough to the tank 110 if an operating pressure of the reductant generated by the pump exceeds a predetermined pressure so as to prevent over pressurizing of the pump, the reductant delivery lines or other components of the reductant insertion assembly 120. In some embodiments, the bypass line may be configured to allow return of the reductant to the tank 110 during purging of the reductant insertion assembly 120 (e.g., after the aftertreatment system 100 is shut off).

In various embodiments, the reductant insertion assembly 120 may also include a blending chamber structured to receive pressurized reductant from a metering valve at a controllable rate. The blending chamber may also be structured to receive air (or any other inert gas, e.g., nitrogen), for example from an air supply unit so as to deliver a combined flow of the air and the reductant to the SCR system 150 through a reductant insertion port 156 positioned on a sidewall of the housing 101 of the aftertreatment system 100 or otherwise on a sidewall of the SCR system housing 152. In various embodiments, a nozzle may be positioned in the reductant insertion port 156 and structured to deliver a stream, a spray or a jet of the reductant into the internal volume of the housing 101 or the SCR system housing 152.

In various embodiments, the reductant insertion assembly 120 may also include a dosing valve positioned within a reductant delivery line for delivering the reductant from the reductant insertion assembly 120 to the SCR system 150. The dosing valve can include any suitable valve, for example a butterfly valve, a gate valve, a check valve (e.g., a tilting disc check valve, a swing check valve, an axial check valve, etc.), a ball valve, a spring loaded valve, an air assisted injector, a solenoid valve or any other suitable valve. The dosing valve may be selectively opened to insert a predetermined quantity of the reductant for a predetermined time into the SCR system 150 or upstream therefrom.

A first filter 130 is positioned upstream of the SCR system 150. The first filter 130 is structured to filter particulate matter (e.g., soot, carbon particles, dust etc.) entrained in the exhaust gas flowing therethrough. The first filter 130 includes a sulfur suppressing compound formulated to reduce an amount of SOx gases include in the exhaust gas flowing through the aftertreatment system 100. In various embodiments, the sulfur suppressing compound can include a sulfur catalyst formulated to trap all or substantially all (e.g., greater than 98%) of SOx gases included in the exhaust gas, thereby reducing the amount of SOx gases included in the exhaust gas emitted from the aftertreatment system 100.

For example, the sulfur catalyst may be formulated to reduce oxidation of $SO_2$ to $SO_3$ for example, by absorbing or adsorbing the $SO_2$ gases or other SOx gases included in the exhaust gas. The sulfur catalyst can include any suitable sulfur catalyst. For example, the sulfur catalyst can include oxides of aluminum, calcium, sodium, magnesium, barium, potassium, copper, iron, cobalt, silver, manganese, cerium, platinum-barium alloy, cerium-zirconium alloy, cerium-iron alloy, manganese-lanthanum-zirconium alloy, iron-lanthanum-zirconium alloy, copper-lanthanum-zirconium alloy, cobalt-lanthanum-zirconium alloy, zeolites, perovskites any other suitable sulfur catalyst or any combinations thereof.

In one embodiment, the sulfur catalyst includes a combination of iron oxide, aluminum oxide and calcium oxide (e.g., the sulfur catalyst available under the trade name SULFURTRAP®). In particular embodiments, the sulfur catalyst can be regenerated by heating the sulfur catalyst to an elevated temperature in the presence of reducing agents. For example, the sulfur catalyst can be regenerated by heating to a temperature of 500 degrees Celsius in the presence of hydrogen and carbon monoxide.

In some embodiments, the first filter 130 includes a first filter housing 132 defining an internal volume. A first filter element 134 is positioned within the first filter housing 132 and is structured to filter the particulate matter. The sulfur suppressing compound is positioned in the first filter element 134. For example, the first filter 130 may include a wall flow filter or a flow through filter. The first filter element 134 may include a cordierite filter element (or core), a silicon carbide filter element, a ceramic filter element or a metal fiber filter element.

As described previously, the sulfur suppressing compound (e.g., a sulfur catalyst) is included in the first filter element 134. For example, the first filter element 134 may include a wall flow filter so that the first filter element 134 includes a plurality of channels. At least a portion of the plurality of channels may be plugged so as to force the exhaust gas flowing therethrough the walls of the first filter element 134.

In some embodiments, the walls of the first filter element 134 may be coated with thin coating of the sulfur suppressing compound. In other embodiments, the sulfur suppressing compound may be infused or entrained into the walls of the first filter element 134, for example mixed with a first filter element material during manufacturing of the first filter element 134. The sulfur suppressing compound traps the SOx gases or reduces the oxidation of $SO_2$ to $SO_3$ as the exhaust gas flows through the first filter 130, thereby reducing the amount of SOx gases in the exhaust gas flowing through the aftertreatment system 100.

In various embodiments, a heat source 138 may be operatively coupled to the first filter 130. The heat source 138 is configured to heat the first filter element 134 so as to regenerate the first filter element 134 and/or the sulfur suppressing compound (e.g., by burning off the particulate matter trapped in the first filter element 134 and/or removing the SOx compounds absorbed in the sulfur suppressing compound). The heat source 138 can include an electrical heater or one or more conduits for communicating hot exhaust gas or a heated coolant from the engine to the first filter 130 on demand so as to heat the first filter 130, thereby regenerating the first filter element 134.

While shown as including the SCR system 150, the aftertreatment system 100 can also include other components, for example one or more flow mixers, particulate filters, oxidation catalysts (e.g., a diesel oxidation catalyst or an ammonia oxidation catalyst), oxygen sensors, ammonia sensors, and/or any other components. For example, an oxidation assembly 140 may be positioned upstream of the SCR system 150 and downstream of the first filter 130. The oxidation assembly 140 may include a housing 142 defining an internal volume within which an oxidation catalyst 144 is positioned.

The oxidation catalyst 144 is formulated to oxidize constituents of the exhaust gas, for example carbon monoxide (CO), NO or unburnt hydrocarbons flowing therethrough. The oxidation catalyst 144 may include precious metals such as platinum and palladium. These precious metals may be susceptible to poisoning by SOx gases included in the exhaust gas which degrades the performance of the oxidation catalyst 144 leading to eventual failure. The sulfur suppressing compound included in the first filter 130 significantly reduces the amount of SOx gases included in the exhaust gas entering the oxidation assembly 140, thereby preventing degradation of the oxidation catalyst 144.

In various embodiments, a second filter 160 may be positioned downstream of the SCR system 150. The second filter 160 also includes the sulfur suppressing compound for reducing the amount of SOx gases included in the exhaust gas after passing through the SCR system 150. For example, the second filter 160 includes a second filter housing 162 defining an internal volume within which a second filter element 164 is positioned. The sulfur suppressing compound is positioned in the second filter element 164. The second filter 160 may be substantially similar to the first filter 130 and is therefore not described in further detail herein. However, it should be understood that all features described with regard to the first filter 130 are equally applicable to the second filter 160.

A second heat source 168 may also be operatively coupled to the second filter 160. The second heat source 168 is configured to heat the second filter 160 so as to regenerate the second filter 160. The second heat source 168 may be substantially similar to the heat source 138 and is therefore not described in further detail herein. However, it should be understood that all features described with regard to the heat source 138 are equally applicable to the second heat source 168.

Figure 2:
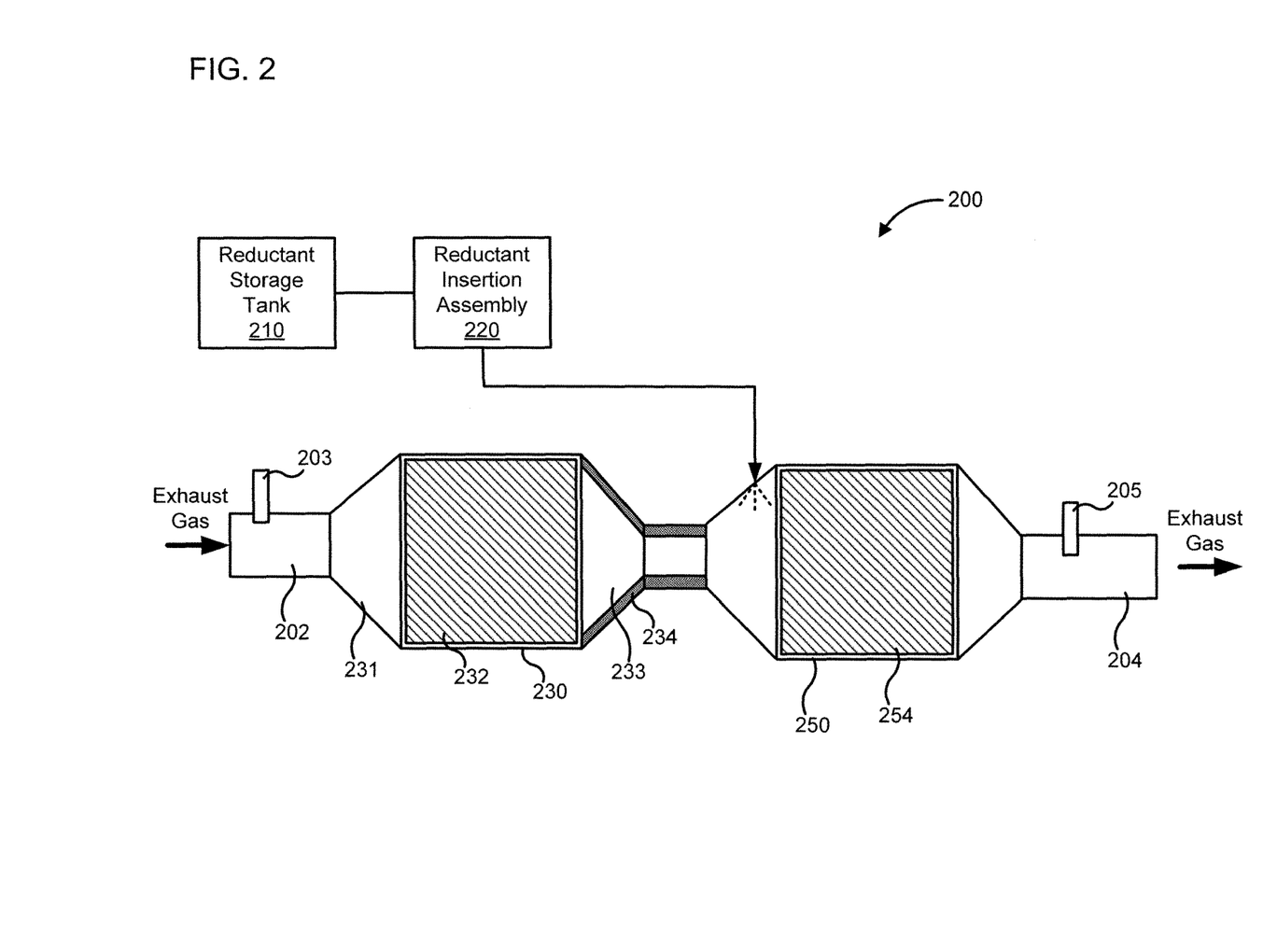
FIG. 2 is a schematic illustration of another embodiment of an aftertreatment system.

FIG. 2 is a schematic illustration of an aftertreatment system 200, according to an embodiment. The aftertreatment system 100 may be fluidly coupled to an engine and configured to decompose constituents (e.g., NOx gases) included in an exhaust gas produced by the engine. The engine can include an IC engine operable on diesel, gasoline, natural gas, biodiesel, ethanol, liquefied petroleum gas (LPG) or any other fuel source. The fuel may include sulfur so that the exhaust gas generated by the engine includes SOx gases, for example $SO_2$ and/or $SO_3$. The aftertreatment system 200 includes a SCR system 250, a reductant storage tank 210, a reductant insertion assembly 220 and, tin this particular embodiment, a partial filter 230.

The aftertreatment system 200 includes an inlet conduit 202 positioned at an inlet of the aftertreatment system 200. The inlet conduit 202 is structured to receive the exhaust gas (e.g., a diesel exhaust gas) from an engine (e.g., a diesel engine) and deliver the exhaust gas to the partial filter 230. An outlet conduit 204 is positioned at an outlet of the aftertreatment system 200. The outlet conduit 204 is structured to expel treated exhaust gas after passing through the aftertreatment system 200 into the environment.

An inlet sensor 203 is positioned in the inlet conduit 202. The inlet sensor 203 may include a NOx sensor (e.g., a physical or virtual NOx sensor) or a SOx sensor (e.g., a physical or virtual SOx sensor) configured to determine an inlet NOx amount of NOx gases or an inlet SOx amount of SOx gases, respectively entering the aftertreatment system 200.

An outlet sensor 205 may be positioned downstream of the SCR system 250, for example in the outlet conduit 204. The outlet sensor 205 may include a NOx sensor (e.g., a physical or virtual NOx sensor) or a SOx sensor (e.g., a physical or virtual SOx sensor) configured to determine an outlet NOx amount of NOx gases or an outlet SOx amount of SOx gases amount included the exhaust gas emitted from the aftertreatment system 200.

In various embodiments, other sensors may be positioned at any location on the SCR system 250, for example pressure sensors (e.g., differential pressure sensor positioned across the SCR system 250), temperature sensors (e.g., positioned in the inlet conduit 202, the outlet conduit 204, upstream and/or downstream of the SCR system 250), oxygen sensors or any other suitable sensors.

The SCR system 250 includes a SCR system housing 252 defining an internal volume within which a catalyst 254 is positioned. The SCR system 250 may be substantially similar to the SCR system 150 and, therefore not described in further detail herein.

The reductant storage tank 210 (also referred to herein as the "tank 210") is structured to store a reductant (e.g., a diesel exhaust fluid such as an aqueous urea solution described before herein). A reductant insertion assembly 220 is fluidly coupled to the tank 210. The reductant insertion assembly 220 is configured to selectively insert the reductant into the SCR system 250 or upstream thereof (e.g., in a mixer positioned upstream of the SCR system 250). The tank 210 and the reductant insertion assembly 220 may be substantially similar to the tank 110 and the reductant insertion assembly 120 and, therefore not described in further detail herein.

A reductant insertion port 256 may be positioned on the housing 252 of the SCR system 250. The reductant insertion port 256 is structured to deliver the reductant into the SCR system 250 or upstream thereof. A nozzle (not shown) may be positioned within the reductant insertion port 256 which is structured to deliver a stream, jet or spray of the reductant into the SCR system 250.

The partial filter 230 is positioned upstream of the SCR system 250. The partial filter 230 is structured to filter particulate matter (e.g., soot, carbon particles, dust etc.) entrained in the exhaust gas flowing therethrough. The partial filter 230 includes a sulfur suppressing compound formulated to reduce an amount of SOx gases in the exhaust gas emitted from the aftertreatment system 200. In various embodiments, the sulfur suppressing compound can include a sulfur catalyst or any other sulfur suppressing compound described herein.

Expanding further, partial filters also known as "partial flow filters" or "partial flow deep-bed filters," function based on the principle of partial flow deep-bed filtration. Partial filters such as the partial filter 230 include structures configured to divert at least a portion of the exhaust gas entering the partial filter through a filter element (e.g., a fiber fleece)

and into adjacent channels included in the partial filter, which filter the particulate matter (PM) included in the exhaust gas. In contrast to wall-flow filters, the trapped PM in the partial filter is burnt off continuously. More specifically, partial filters rely on passive regeneration dependent on engine out NOx.

Thus, partial filters are low maintenance filters which do not have to be regenerated periodically. Such filters can, for example last for the entire life of the aftertreatment system (e.g., an aftertreatment system included in a vehicle) without having to be replaced. Moreover, since trapped PM is burnt continuously, partial filters do not get clogged and therefore do not present a fire hazard, which can occur with clogged filters. In particular embodiments, partial filters can also be catalyzed by coating with noble metals and washcoat which can also catalyze the decomposition of hydrocarbons and CO included in the exhaust gas. Partial filters are particularly suitable for filtering nanoparticles (e.g., having a size less than 400 nm) from the exhaust gas.

The partial filter 230 includes a partial filter housing 232 defining an internal volume. A partial filter element 234 is positioned within the inner volume defined by the partial filter housing 232. In various embodiments, the partial filter element 234 can include a ceramic partial filter element or a metallic partial filter element. The partial filter housing 232 includes an inlet 231 structured to receive the exhaust gas from the inlet conduit 202. The partial filter housing 232 also includes an outlet 233 structured to communicate filtered exhaust gas from the partial filter 230 to the SCR system 250.

The sidewalls of the outlet 233 of the partial filter housing 232 are coated with the coating 236 of the sulfur suppressing compound. Thus, the exhaust gas after flowing through the partial filter element 234 passes over the coating 236 of the sulfur suppressing compound which absorbs or otherwise removes the SOx gases from the exhaust gas as the exhaust gas flows through the outlet 233.

While shown as comprising a single partial filter 230, in some embodiments the aftertreatment system 200 can include a plurality of partial filters, for example a second partial filter positioned downstream of the SCR system 250, or positioned downstream of the partial filter 230 and upstream of the SCR system 250. In various embodiments, an oxidation catalyst assembly (e.g., the oxidation catalyst assembly 240) may also be positioned upstream of the SCR system 250 and downstream of the partial filter 230.

The aftertreatment system 200 can also include other components, for example one or more flow mixers, particulate filters, oxidation catalysts (e.g., a diesel oxidation catalyst or an ammonia oxidation catalyst), oxygen sensors, ammonia sensors, and/or any other components described herein.

Figure 3:
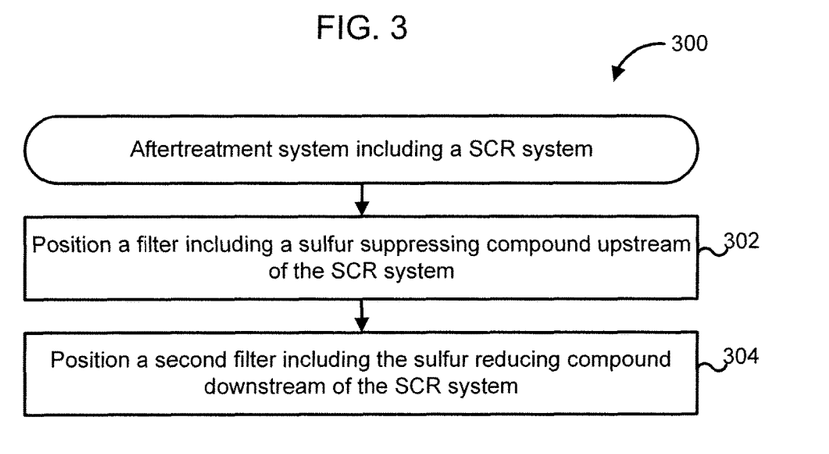
FIG. 3 is a schematic flow diagram of an embodiment of a method for providing a system that reduces an amount of SOx gases included in an exhaust gas flowing through an aftertreatment system.

FIG. 3 is a schematic flow diagram of an example method 300 for reducing an amount of SOx gases (e.g., $SO_2$ or $SO_3$) included in an exhaust gas flowing through an aftertreatment system (e.g., the aftertreatment system 100 or 200). The aftertreatment system may include a SCR system (e.g., the SCR system 150 or 250) structured to decompose constituents of the exhaust gas (e.g., NOx gases) flowing through the SCR system in the presence of a reductant, as described before herein.

The method 300 includes positioning a filter including sulfur suppressing compound upstream of the SCR system at 302. For example, the filter can include the first filter 130, the partial filter 230 or any other filter described herein. Any suitable sulfur suppressing compound such as a sulfur catalyst, a sulfur trap or any other suitable sulfur suppressing compound described herein is included in the filter. The sulfur suppressing compound may be included in a filter element of the filter (e.g., the filter element 134 of the first filter 130) or coated on an outlet of the filter (e.g., the coating 236 of the sulfur suppressing compound coated on the outlet 233 of the partial filter housing 232 of the partial filter 230).

As described before, the sulfur suppressing compound is formulated to absorb, remove or otherwise suppress oxidation of SOx gases (e.g., oxidation of $SO_2$ to $SO_3$) included in the exhaust gas flowing through the aftertreatment system (e.g., the aftertreatment system 100 or 200).

In particular embodiments, a second filter is positioned downstream of the SCR system at 304. For example, the second filter 160 is positioned downstream of the SCR system 150. The second filter 160 may serve as a backup filter to absorb or remove any residual SOx gases remaining in the exhaust gas after passing through the first filter 130 before the exhaust gas is emitted into the environment.

Figure 4:
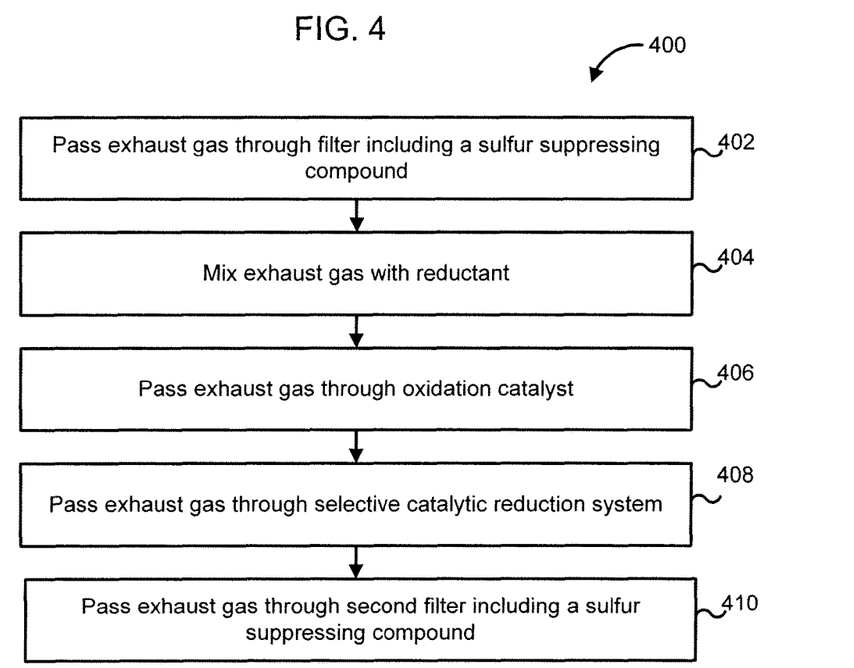
FIG. 4 is a is a schematic flow diagram of an example method for treating exhaust gases according to various embodiments.

FIG. 4 is a is a schematic flow diagram of an example method 400 for treating exhaust gases according to various embodiments. At 402, exhaust gas passes through a filter comprising a sulfur suppressing compound. The sulfur suppressing compound reduces an amount of SOx gases included in the exhaust gas flowing through the aftertreatment system. The filter may, for example, comprise any of the structures discussed herein. At 404, after passing the exhaust gas through the filter, the exhaust gas may be mixed with reductant inserted by a reductant insertion assembly. Again, the reductant insertion assembly may take, for example, any of the forms discussed herein. At 406, the exhaust gas may be passed through an oxidation catalyst. At 408, the exhaust gas is passed through a selective catalytic reduction system comprising a catalyst, the catalyst decomposing constituents of the exhaust gas passing therethrough. At 410, after passing the exhaust gas through the selective catalytic reduction system, the exhaust gas may be passed through a second filter positioned downstream of the selective catalytic reduction system, the second filter also comprising the sulfur suppressing compound. The second filter may comprise, for example, any of the structures discussed herein in the context of FIG. 1.

It should be noted that the term "example" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Additionally, it should be understood that features from one embodiment disclosed herein may be combined with features of other embodiments disclosed herein as one of ordinary skill in the art would understand. Other substitutions, modifications, changes and omissions may also be made in the design, operating conditions and arrangement of the various exemplary embodiments without departing from the scope of the present invention.

While this specification contains many specific implementation details, these should not be construed as limitations on the scope of any inventions or of what may be claimed, but rather as descriptions of features specific to particular implementations of particular inventions. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. An aftertreatment system, comprising:
    a selective catalytic reduction system comprising a catalyst formulated to decompose constituents of an exhaust gas passing therethrough; and
    a filter positioned upstream of the selective catalytic reduction system, the filter comprising:
        a filter housing having an inlet and an outlet, a sulfur suppressing compound coated on an inner surface of the outlet and formulated to reduce an amount of SOx gases included in the exhaust gas flowing through the aftertreatment system; and
        a filter element positioned within the filter housing, the filter element also comprising the sulfur suppressing compound.

2. The aftertreatment system of claim 1, wherein the filter is a first filter, and wherein the aftertreatment system further comprises:
    a second filter positioned downstream of the selective catalytic reduction system, the second filter also comprising the sulfur suppressing compound.

3. The aftertreatment system of claim 2, wherein the second filter comprises:
    a second filter housing; and
    a second filter element positioned within the second filter housing, the second filter element comprising the sulfur suppressing compound.

4. The aftertreatment system of claim 1, wherein the filter comprises a partial flow filter.

5. The aftertreatment system of claim 4, wherein the partial flow filter is configured to catalyze decomposition of hydrocarbons and carbon monoxide included in the exhaust gas.

6. The aftertreatment system of claim 1, wherein the aftertreatment system further comprises:
    an oxidation catalyst positioned upstream of the selective catalytic reduction system and downstream of the filter.

7. The aftertreatment system of claim 1, wherein the sulfur suppressing compound comprises a sulfur catalyst formulated to absorb SOx gases.

8. The aftertreatment system of claim 1, further comprising a reductant insertion assembly, the reductant insertion assembly configured to insert reductant at a location downstream of the filter.

9. The aftertreatment system of claim 1, wherein a cross-section of the outlet of the filter housing decreases from a first end proximate to the filter to a second end separated from the filter, the sulfur suppressing compound being coated on the inner surface of the outlet between the first and second ends.

10. A method of treating exhaust gas in an aftertreatment system, comprising:
    passing the exhaust gas through a filter comprising:
        a filter housing having an inlet and an outlet, a sulfur suppressing compound coated on an inner surface of the outlet and formulated to reduce an amount of SOx gases included in the exhaust gas flowing through the aftertreatment system; and
        a filter element positioned within the filter housing the filter element also comprising the sulfur suppressing compound; and
    after passing the exhaust gas through the filter, passing the exhaust gas through a selective catalytic reduction system comprising a catalyst, the catalyst decomposing constituents of the exhaust gas passing therethrough.

11. The method of claim 10, wherein the filter is a first filter, and further comprising:
    after passing the exhaust gas through the selective catalytic reduction system, passing the exhaust gas through a second filter positioned downstream of the selective catalytic reduction system, the second filter also comprising the sulfur suppressing compound.

12. The method of claim 10, wherein the second filter comprises:
    a second filter housing; and
    a second filter element positioned within the second filter housing, the second filter element comprising the sulfur suppressing compound.

13. The method of claim 10, wherein the filter comprises a partial flow filter.

14. The method of claim 13, wherein the partial flow filter catalyzes decomposition of hydrocarbons and carbon monoxide included in the exhaust gas.

15. The method of claim 10, further comprising, after passing the exhaust gas through the filter and before passing the exhaust gas through the selective catalytic reduction catalyst, passing the exhaust gas through an oxidation catalyst.

16. The method of claim 10, wherein the sulfur suppressing compound comprises a sulfur catalyst formulated to absorb SOx gases.

17. The method of claim 10, further comprising, after passing the exhaust gas through the filter, mixing the exhaust gas with a reductant inserted by a reductant insertion assembly.

18. The method of claim 10, wherein a cross-section of the outlet of the filter housing decreases from a first end proximate to the filter to a second end separated from the filter, the sulfur suppressing compound being coated on the inner surface of the outlet between the first and second ends.

* * * * *